(12) United States Patent
Mineo et al.

(10) Patent No.: US 8,977,430 B2
(45) Date of Patent: Mar. 10, 2015

(54) ELECTRONIC STABILITY CONTROL SYSTEM INDICATOR

(71) Applicant: Robert Bosch GmbH, Stuttgart (DE)

(72) Inventors: Kenta Mineo, Novi, MI (US); Hirak Chanda, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 13/727,021

(22) Filed: Dec. 26, 2012

(65) Prior Publication Data
US 2014/0180538 A1    Jun. 26, 2014

(51) Int. Cl.
| | |
|---|---|
| *G06F 17/00* | (2006.01) |
| *B60W 50/14* | (2012.01) |
| *B60K 35/00* | (2006.01) |
| *B60T 8/1755* | (2006.01) |
| *G01D 1/18* | (2006.01) |
| *G01D 7/00* | (2006.01) |

(Continued)

(52) U.S. Cl.
CPC ............... *G06F 17/00* (2013.01); *B60W 50/14* (2013.01); *B60K 35/00* (2013.01); *B60T 8/17551* (2013.01); *G01D 1/18* (2013.01); *G01D 7/002* (2013.01); *B60T 8/1755* (2013.01); *B60W 30/02* (2013.01); *B60W 30/18145* (2013.01); *G01P 1/103* (2013.01); *B60T 2250/03* (2013.01); *B60W 2050/146* (2013.01); *B60W 2520/14* (2013.01)
USPC ................ 701/36; 701/29.2; 701/38; 701/70; 340/436

(58) Field of Classification Search
USPC .......................... 701/36, 29.2, 70, 38; 340/436
See application file for complete search history.

(56) References Cited

U.S. PATENT DOCUMENTS 3,714,624 A * 1/1973 Story .......................... 340/971
4,858,135 A * 8/1989 Clish et al. .................... 701/93

(Continued)

FOREIGN PATENT DOCUMENTS

| DE | 4030704 | 4/1992 |
| DE | 4314826 | 11/1994 |

(Continued)

OTHER PUBLICATIONS

Ravani, B. et al., "Improvement of a Human-Machine Interface (HMI) for Driver Assistance Using an Event-Driven Prompting Display," IEEE Transactions on Control Systems Technology, May 2011, vol. 19, No. 3, pp. 622-627.

(Continued)

*Primary Examiner* — Mary Cheung
*Assistant Examiner* — Michael Berns
(74) *Attorney, Agent, or Firm* — Michael Best & Friedrich LLP

(57) ABSTRACT

An electronic stability control indication system including a bar-graph-type display, a processor, and a memory. The memory stores instructions that, when executed by the processor, control the operation of the electronic stability control indication system. The system receives a first signal from a yaw rate sensor indicative of an actual yaw rate of the vehicle. The system then determines a target yaw rate and a threshold difference for the vehicle. If the difference between the actual yaw rate and the target yaw rate exceeds the difference threshold, an electronic stability control system is activated. The system also provides a visual representation of the difference between the actual yaw rate and the target yaw ratio relative to the threshold difference on the bar-graph-type display.

13 Claims, 4 Drawing Sheets

(51) Int. Cl.
*B60W 30/02* (2012.01)
*B60W 30/18* (2012.01)
*G01P 1/10* (2006.01)

(56) References Cited

U.S. PATENT DOCUMENTS

| | | | |
|---|---|---|---|
| 5,402,342 | A | 3/1995 | Ehret et al. |
| 7,542,838 | B2 * | 6/2009 | Bouchard et al. ............... 701/71 |
| 7,603,228 | B2 | 10/2009 | Coughlin |
| 7,719,431 | B2 | 5/2010 | Bolourchi |
| 7,868,750 | B2 | 1/2011 | Miller et al. |
| 8,116,971 | B2 | 2/2012 | Chen et al. |
| 8,248,223 | B2 | 8/2012 | Periwal |
| 8,565,993 | B2 * | 10/2013 | Lu et al. .......................... 701/70 |
| 2008/0042813 | A1 * | 2/2008 | Wheatley et al. ............. 340/435 |
| 2011/0106334 | A1 * | 5/2011 | Filev et al. ........................ 701/1 |
| 2011/0166744 | A1 * | 7/2011 | Lu et al. .......................... 701/34 |
| 2011/0187520 | A1 | 8/2011 | Filev et al. |
| 2011/0187522 | A1 * | 8/2011 | Filev et al. .................... 340/441 |
| 2011/0193693 | A1 * | 8/2011 | Filev et al. .................... 340/435 |
| 2012/0212353 | A1 | 8/2012 | Fung et al. |

FOREIGN PATENT DOCUMENTS

| | | |
|---|---|---|
| DE | 10341846 | 3/2005 |
| DE | 102005002276 A1 * | 7/2006 |
| DE | 102006012783 | 9/2007 |
| EP | 1811481 | 7/2007 |
| EP | 2135783 | 12/2009 |
| EP | 2672275 | 12/2013 |
| FR | 2748239 | 11/1997 |
| FR | 2886264 | 12/2006 |

OTHER PUBLICATIONS

International Search Report and Written Opinion for Application No. PCT/US2013/077057 dated Jun. 20, 2014 (15 pages).

* cited by examiner

ELECTRONIC STABILITY CONTROL SYSTEM INDICATOR

BACKGROUND

The present invention relates to electronic stability control systems or other vehicle control intervention systems.

SUMMARY

In one embodiment, the invention provides a vehicle intervention indication system comprising a display, a processor, and a memory. The memory stores instructions that, when executed by the processor, control the operation of the vehicle intervention indication system. The system is configured to receive a first signal indicative of a value sensed by a first vehicle sensor. The system then determines a vehicle performance value based at least in part on the first signal. The vehicle performance value is compared to an intervention threshold. If the vehicle performance value exceeds the intervention threshold, intervening corrective measures are applied to at least one vehicle system. An indication of the vehicle performance value relative to the intervention threshold is provided on the display.

In another embodiment, the invention provides an electronic stability control indication system including a bar-graph-type display, a processor, and a memory. The memory stores instructions that, when executed by the processor, control the operation of the electronic stability control indication system. The system receives a first signal from a yaw rate sensor indicative of an actual yaw rate of the vehicle. The system then determines a target yaw rate and a threshold difference for the vehicle. If the difference between the actual yaw rate and the target yaw rate exceeds the difference threshold, an electronic stability control system is activated. The system also provides a visual representation of the difference between the actual yaw rate and the target yaw ratio relative to the threshold difference on the bar-graph-type display.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
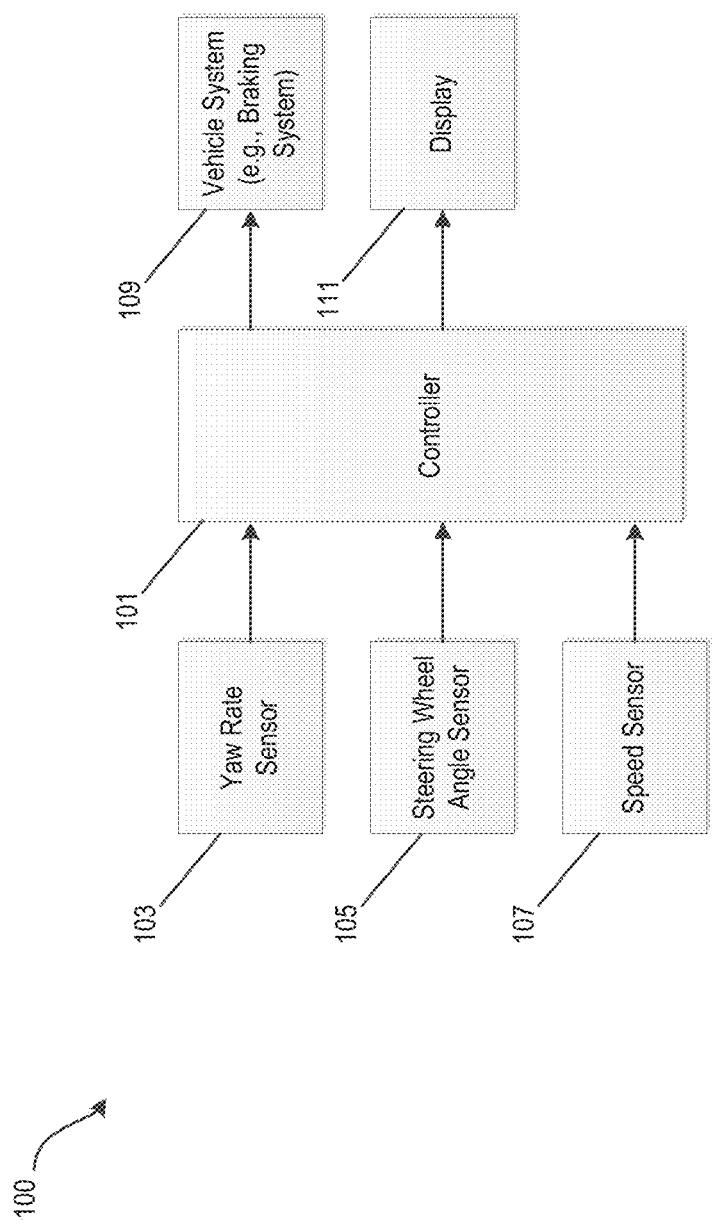
FIG. 1 is a block diagram of an electronic stability control system according to one embodiment.

FIG. 1 schematically shows the components of an electronic stability control system 100 for a vehicle. A controller 101 receives input signals from multiple sensors including, for example, a yaw rate sensor 103, a steering wheel angle sensor 105, and a speed sensor 107. Based on the input signals from the speed sensor 107 and the steering wheel angle sensor 105, the controller 101 determines an intended operation of the vehicle including a target yaw rate that the vehicle should exhibit if performing correctly. One example of a vehicle stability control system that calculates a target yaw rate is described in detail in U.S. Pat. No. 5,402,342 which is incorporated herein by reference.

As described further below, when the actual performance of the vehicle differs from the anticipated performance (i.e., oversteering, understeering, or otherwise slipping), the controller 101 provides intervening control of one or more vehicle systems 109. The intervention could come in the form of reducing the speed of one or more of the wheels or applying a braking force to one or more of the wheels in a way that causes the vehicle performance to approach the intended performance. Furthermore, the controller 101 communicates information to the driver regarding the differences between the actual vehicle performance and the intended vehicle performance by providing an output to a display 111.

Figure 2:
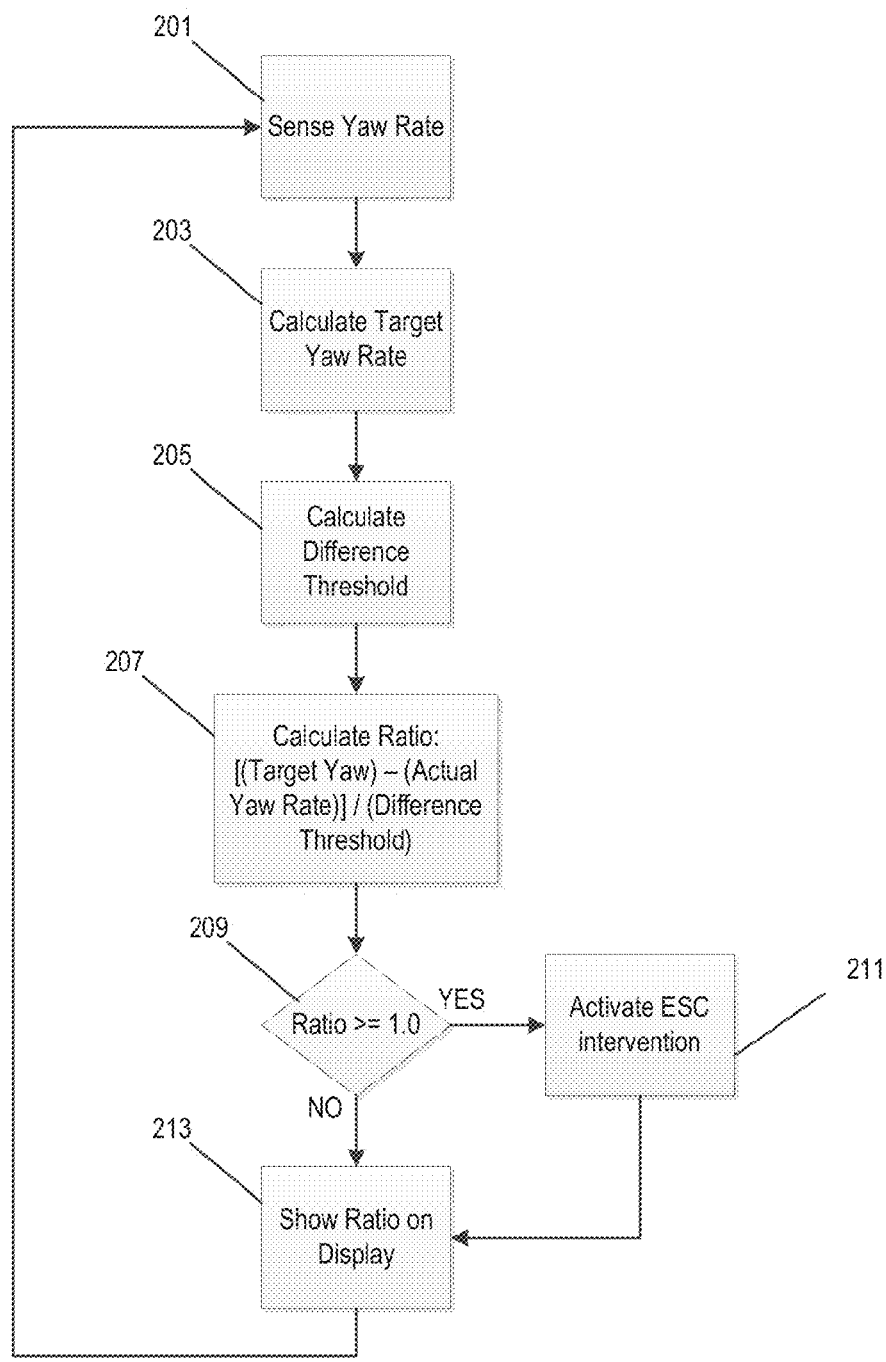
FIG. 2 is a flow chart of a method of operating the electronic stability control system of FIG. 1.

FIG. 2 describes one example of a method of operating the electronic stability control system of FIG. 1. The controller 101 receives an input signal from the yaw rate sensor 103 and, based on the signal, determines an actual sensed yaw rate of the vehicle (step 201). The controller 101 then calculates a target yaw rate based on various factors including, for example, the steering wheel angle, the vehicle speed, wheel speed, etc. (step 203). The controller 101 then calculates a difference threshold (step 205). The difference threshold is the maximum deviation between the target yaw rate and the actual yaw rate that is allowed before the controller 101 applies intervening control of one or more of the vehicle systems to restore vehicle stability. The difference threshold can be calculated in a variety of way and, in some cases, can be tuned for the specific vehicle or desired performance characteristics. In some cases, the difference threshold is calculated based on the vehicle speed and may be proportional to the measured yaw rate of the vehicle.

After calculating the target yaw rate and the difference threshold, the controller 207 calculates the following ratio (step 207):

$$\frac{|(\text{Target Yaw Rate}) - (\text{Actual Yaw Rate})|}{(\text{Difference Threshold})} \quad (1)$$

If the calculated ratio is greater than or equal to 1.0 (step 207), then the difference between the target yaw rate and the actual yaw rate has exceeded the difference threshold and the controller 101 applies ESC intervention to one or more of the vehicle systems (step 211). In either case, the controller 101 provides an output to a display which then provides a visual indication of the ratio (step 213) as described in further detail below.

It is noted that, in the ratio in equation (1) above, it is the absolute value of the difference between the target yaw rate and the actual yaw rate that is compared to the difference threshold. As such, the ratio of equation (1) will always be a positive value. However, in some cases, as described in further detail below, the controller 101 is configured to calculate a ratio that does not consider the absolute value of the difference between the target yaw rate and the actual yaw rate. In those examples, the controller 101 is capable of calculating a positive ratio or a negative ratio and, as such, is able to identify oversteer conditions (where the actual yaw rate exceeds the target yaw rate) and understeer conditions (where the actual yaw rate is less than the target yaw rate).

Figure 3A:
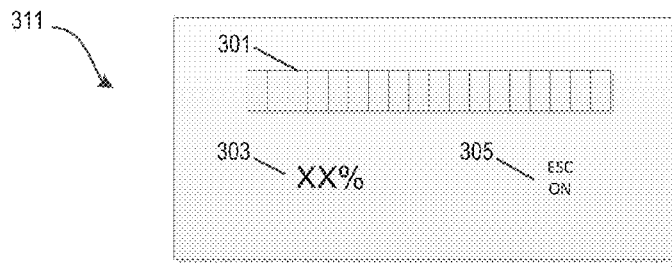
FIGS. 3A, 3B, 3C, and 3D are examples of a first type of display for use with the electronic stability control system of FIG. 1.

FIG. 3A illustrates in further detail one example of a display 311 that can be used with the system of FIG. 1. The display 311 includes a linear display element 301. The linear display element 301 operates as a bar graph to provide a visual indication of the ratio calculated above. Based on this linear representation, the driver is able to visually observe how close the actual operation of the vehicle is to the intended operation of the vehicle. By viewing the linear display element 301, the driver is also aware of how close the vehicle is to activating ESC intervention. The display 311 illustrated in FIG. 3A also includes a numeric field 303 that shows the ratio calculated above as a percentage and another field 305 that indicates when ESC intervention is being applied.

The display 311 of FIG. 3A can be implemented in a variety of ways including, for example, a multiple segmented LCD display, a pixelated LCD or LED display, or other combination of lights. The display 311 is positioned in a vehicle where it can be easily viewed by a driver while operating the vehicle. In some cases, the display 311 is integrated directly into the dashboard display panel along with the vehicle speedometer, fuel gauge, tachometer, etc. However, in some cases, the display can be an optional, added feature. In those cases, the display can be incorporated into a separate housing that mounted on top of the vehicle dashboard, attaches to the windshield, or is otherwise positioned where it can be viewed by the driver.

Figure 3B:
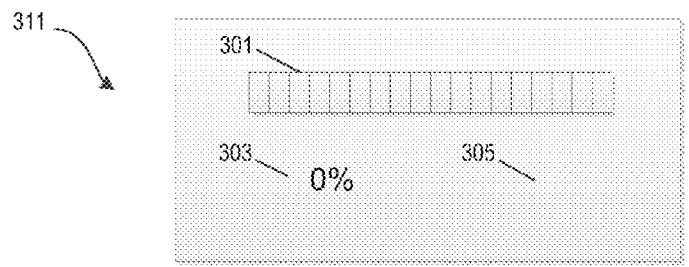
Figure 3C:
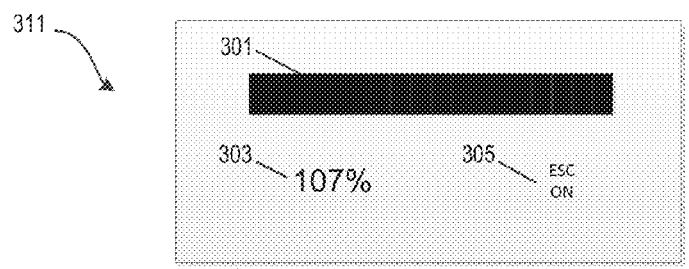
Figure 3D:
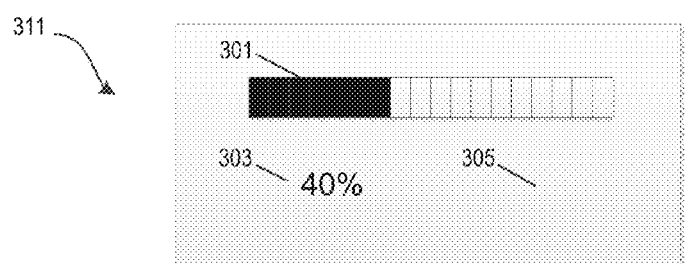

FIGS. 3B, 3C, and 3D further illustrate the operation of the various elements of the display 311. As shown in FIG. 3B, when the actual yaw rate is equal to the target yaw rate, the linear element 301 shows an "empty bar." This equality is also illustrated as a percentage ("0%") in the numeric field 303. Because ESC intervention is not activated under these conditions, field 305 is not displayed.

Conversely, in the example of FIG. 3C, the difference between the actual yaw rate and the target yaw rate has exceeded the difference threshold. This is illustrated in the linear display element 301 by showing a "full bar." The numeric field 303 shows the actual ratio as a percentage. Because the difference threshold has been exceeded and ESC intervention has been applied, field 305 is displayed in the example of FIG. 3C and shows the words "ESC ON." In the example of FIG. 3C, the linear display element 301 appears as a "full bar" whenever the difference threshold is exceeded regardless of the actual difference between the actual yaw rate and the target yaw rate. However, the ratio is continually calculated and displayed in numeric field 303. As such, the driver is provided with an indication of how close the vehicle is to deactivating the ESC intervention and returning to normal operation. However, in some alternative embodiments, the linear display element is configured to visually indicate the actual ratio by providing a bar graph that continues beyond a ratio value of 1.0.

FIG. 3D illustrates a more common case—when the actual yaw rate differs from the target yaw rate, but the difference is not substantial enough to trigger activation of ESC intervention. In this example, the value of the calculated ratio is "0.4." As such, the linear display element 301 shows the "bar graph" filled proportionally and the numeric field indicates the ratio as "40%." Because the difference threshold has not been exceeded and ESC intervention has not been activated, the field 305 is not displayed.

As discussed above, ratio of equation (1) considers the absolute value (or magnitude) of the difference between the actual yaw rate and the target yaw rate. As such, the linear display element 301 of FIGS. 3A, 3B, 3C, and 3D are capable of illustrating a ratio ranging from 0.0 to 1.0. However, in other embodiments, the ratio is not calculated based on an absolute value in order to determine whether the vehicle is experiencing an oversteer or an understeer condition. As such, the linear display element 401 of display 411 illustrated in FIGS. 4A, 4B, 4C, and 4D is configured to display a ratio ranging from −1.0 to +1.0.

Figure 4A:
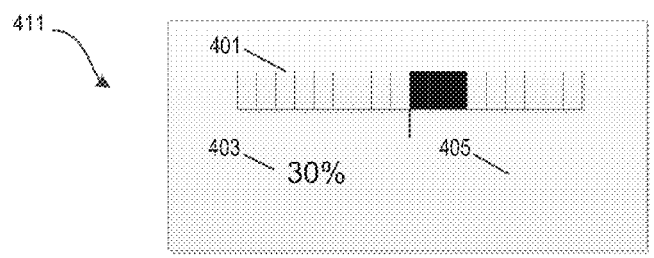
FIGS. 4A, 4B, 4C, and 4D are example of another type of display for use with the electronic stability control system of FIG. 1.

In FIG. 4A, the controller 101 has calculated a ratio of 0.30. The numeric field 403 displays the value of the ratio as a percentage and, because the difference threshold has not been exceeded, field 405 is not displayed. Because the actual yaw rate is less than the target yaw rate, the value of the ratio is positive indicating an understeer condition. As such, the linear display element shows the bar graph proportionally filled to the right of the center point (i.e., the "zero point").

Figure 4B:
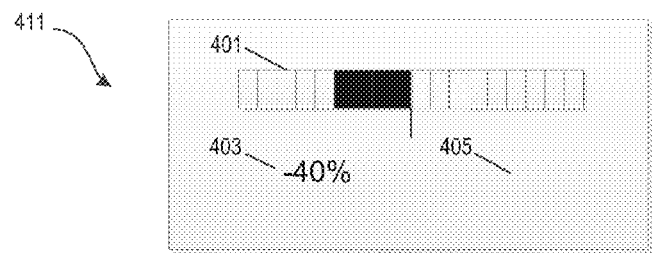

Conversely, FIG. 4B shows an example of an oversteer condition. The numeric field 403 shows the ratio as a percentage and, because the actual yaw rate in this example is greater than the target yaw rate, the value of the percentage is negative. To visually illustrate this on the linear display element 401, the bar graph is proportionally filled to the left of the center point.

Figure 4C:
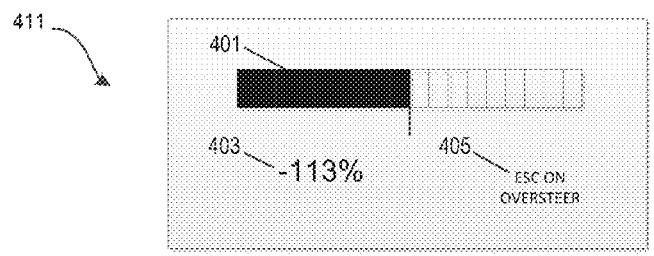
Figure 4D:
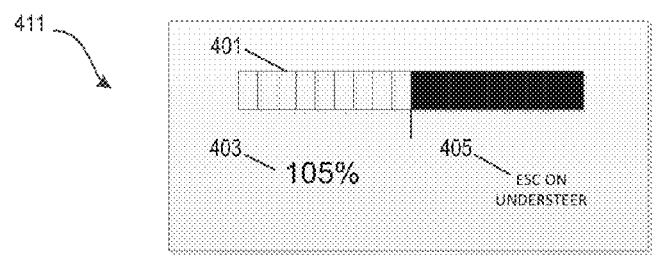

FIGS. 4C and 4D show oversteer and understeer conditions that result in activation of ESC intervention. In FIG. 4C, the difference between the actual yaw rate and the target yaw rate exceeds the difference threshold. Because the actual yaw rate is greater than the target yaw rate, the ratio is a negative value (i.e., −113% as shown in numeric field 403). Because ESC intervention is activated, field 405 is displayed. However, unlike display 311, display 411 specifically informs the driver that an oversteer condition has occurred by displaying the words "ESC ON OVERSTEER" in field 405. Furthermore, because the calculated ratio exceeds −1.0, the linear display element 401 shows the bar graph as a "full bar" to the left of the center point.

In the example of FIG. 4D, the vehicle is experiencing excessive understeer conditions (i.e., the actual yaw rate is lower than the target yaw rate). The numeric indicator 403 shows the calculated ratio as a percentage—a positive value. Because the value of the ratio is greater than +1.0, the linear indicator 401 shows a "full bar" to the left of the center point and field 405 displays the words "ESC ON UNDERSTEER."

FIGS. 3A-4D illustrate only a few examples of displays that can be used in the various embodiments of this system. Alternative displays are possible including, for example, an analog needle that moves to indicate the ratio on a scale, an array of LEDs positioned in a line, etc. Furthermore, although the illustrated displays each include a linear display element, a numeric field, and an additional field for indicating when the ESC has been activated, other embodiments may only include one or two of these features.

Additionally, equation (1) described above describes one example of an equation that can be used to calculate a ratio to be visually indicated on the display. Other embodiments may implement a different equation. For example, some systems may calculate a ratio of: (actual yaw rate)/(target yaw rate). This ratio would equal "1.0" when the actual yaw rate equals the target yaw rate. In order to better illustrate when the ESC system is about to be activated, the scale illustrated on the linear display element could be adjusted or truncated so that one end of the bar graph indicates a ratio of "1.0" while the other end indicates a threshold ratio, wherein ESC intervention is activated when the threshold ratio is surpassed. Also, although the examples above show a "full bar" when ESC intervention is activated and an "empty bar" when the actual yaw rate is equal to the target yaw rate, the scale can be reversed in other implementations. For example, the linear display element in some constructions would show a "full bar" when the target yaw rate is equal to the actual yaw rate and an "empty bar" when the difference between the target yaw rate and the actual yaw rate exceeds the difference threshold.

Lastly, although the examples described above discuss implementing ESC intervention based only on a comparison of target yaw rate to the actual yaw rate, other ESC systems may use other criteria for determining when to implement ESC intervention. For example, the controller 101 may perform a more complex computation of an ESC variable based on inputs from one or more sensors. In that case, the controller 101 might also calculate a target ESC variable in order to implement the ratio determinations discussed above. Furthermore, some ESC systems may monitor multiple different variables. For example, the controller 101 may be configured to compare wheel speed to vehicle speed while also comparing target yaw rate to actual yaw rate. Such systems that monitor multiple vehicle performance variables may include a modified display that includes two linear display elements. Alternatively, the controller 101 could be configured to display the ratio corresponding to the variable that is currently exhibiting the greatest deviation from the target variable. For example, if the difference between target vehicle speed (determined based in part on the wheel speed of the vehicle) and actual vehicle speed is greater than the difference between the actual yaw rate and the target yaw rate, then the controller would output the vehicle speed ratio to be shown on the display.

Thus, the invention provides, among other things, a vehicle intervention indication system that provides an indication of a vehicle performance value relative to an intervention threshold on a display. Various features and advantages of the invention are set forth in the following claims.

What is claimed is:

1. A vehicle intervention indication system, the system comprising:
   a display;
   a processor; and
   a memory storing instructions that, when executed by the processor, cause the vehicle intervention indication system to
      receive a first signal indicative of a value sensed by a first vehicle sensor,
      determine a target vehicle performance value,
      calculate a difference between the target vehicle performance value and the determined vehicle performance value,
      compare the difference between the target vehicle performance value and the determined vehicle performance value to an intervention threshold,
      apply intervening corrective measures to at least one vehicle system when the difference between the target vehicle performance value and the determined vehicle performance value exceeds the intervention threshold, and
      provide on the display an indication of a ratio of the difference between the target vehicle performance value and the determined vehicle performance value relative to the intervention threshold.

2. The vehicle intervention indication system of claim 1, wherein the target vehicle performance value is a target yaw rate and the determined vehicle performance value is an actual yaw rate.

3. The vehicle intervention indication system of claim 1, wherein the display includes a linear display element, and wherein the indication provided on the display includes a visual representation of the ratio on the linear display element.

4. The vehicle intervention indication system of claim 3, wherein the linear display element includes a digital bar graph where one end-point of the digital bar graph represents a condition where the determined vehicle performance value is equal to the target vehicle performance value and an opposite end-point of the digital bar graph represents a condition where the difference between the determined vehicle performance value and the target vehicle performance value exceeds the intervention threshold.

5. The vehicle intervention indication system of claim 3, wherein the linear display element includes a digital bar graph where one end-point of the digital bar graph represents a condition where the determined vehicle condition value exceeds the target vehicle condition value by at least the intervention threshold, an opposite end-point of the digital bar graph represents a condition where the determined vehicle condition value is less than the target vehicle condition value by at least the intervention threshold, and a middle point of the digital bar graph represents a condition where the determined vehicle condition value is equal to the target vehicle condition value.

6. The vehicle intervention indication system of claim 1, wherein the display includes a numeric display element, and wherein the indication provided on the display includes a numeric representation of the ratio as a percentage.

7. The vehicle intervention indication system of claim 1, wherein the first vehicle sensor includes a yaw rate sensor.

8. The vehicle intervention indication system of claim 1, wherein the instructions, when executed by the processor, further cause the vehicle intervention indication system to receive a second signal indicative of a value sensed by the second vehicle sensor, and wherein the vehicle performance value is determined based at least in part on the first signal and the second signal.

9. An electronic stability control indication system, the system comprising:
   a bar-graph-type display;
   a processor; and
   a memory storing instructions that, when executed by the processor, cause the vehicle intervention indication system to
      receive a first signal from a yaw rate sensor indicative of an actual yaw rate of the vehicle;
      determine a target yaw rate for the vehicle;
      determine a threshold difference for the vehicle;
      determine a difference between the actual yaw rate and the target yaw rate;
      activate an electronic stability control system when the difference between the actual yaw rate and the target yaw rate exceeds the threshold difference;
      calculate a ratio of the difference between the target yaw rate and the actual yaw rate relative to a threshold difference;
      provide an output on the bar-graph-type display, the output including a visual representation of the ratio of the difference between the actual yaw rate and the target yaw rate relative to the threshold difference.

10. The electronic stability control indication system of claim 9, wherein, when the actual yaw rate is equal to the target yaw rate, the visual representation on the bar-graph-type display includes a full bar.

11. The electronic stability control indication system of claim 10, wherein, when the difference between the actual yaw rate and the target yaw rate exceeds the threshold difference, the visual representation on the bar-graph-type display includes an empty bar.

12. The electronic stability control indication system of claim 9, wherein, when the difference between the actual yaw rate and the target yaw rate exceeds the threshold difference, the visual representation on the bar-graph-type display includes a full bar.

13. The electronic stability control indication system of claim 12, wherein when the actual yaw rate is equal to the target yaw rate, the visual representation on the bar-graph-type display includes an empty bar.

* * * * *